(12) United States Patent
Wulff

(10) Patent No.: US 7,195,168 B2
(45) Date of Patent: Mar. 27, 2007

(54) TERMINAL DESIGN WITH SHOCK ISOLATION ASSEMBLY

(75) Inventor: Thomas Wulff, North Patchogue, NY (US)

(73) Assignee: Symbol Technologies, Inc., Holtsville, NY (US)

(*) Notice: Subject to any disclaimer, the term of this patent is extended or adjusted under 35 U.S.C. 154(b) by 407 days.

(21) Appl. No.: 10/611,693

(22) Filed: Jul. 1, 2003

(65) Prior Publication Data

US 2005/0001037 A1    Jan. 6, 2005

(51) Int. Cl.
G06K 7/10 (2006.01)

(52) U.S. Cl. .............................. 235/462.45; 235/472.01

(58) Field of Classification Search ........... 235/462.45, 235/462.46, 472.01, 472.02
See application file for complete search history.

(56) References Cited

U.S. PATENT DOCUMENTS

| | | | |
|---|---|---|---|
| 5,130,520 A * | 7/1992 | Shepard et al. | 235/462.45 |
| 5,468,952 A | 11/1995 | Alexander et al. | |
| 6,036,098 A | 3/2000 | Goldman et al. | |
| 6,244,512 B1 * | 6/2001 | Koenck et al. | 235/472.01 |
| 6,299,067 B1 * | 10/2001 | Schmidt et al. | 235/462.45 |
| 6,308,892 B1 * | 10/2001 | Swartz et al. | 235/472.01 |
| 6,321,990 B1 * | 11/2001 | Giordano et al. | 235/472.01 |
| 6,497,368 B1 * | 12/2002 | Friend et al. | 235/472.01 |
| 6,648,228 B2 * | 11/2003 | Dvorkis | 235/462.43 |

* cited by examiner

Primary Examiner—Karl D. Frech
(74) Attorney, Agent, or Firm—Amin, Turocy, & Calvin, LLP

(57) ABSTRACT

Systems and methodologies are disclosed for isolating a portable hand held electronic unit from external mechanical shocks and/or vibrations by dampening them at several levels. The system can absorb an external mechanical shock at three different levels by employing an external bumper system, elastic housing design features, and an internal frame isolation. Moreover, such isolation assembly simplifies production of the portable electronic unit by enabling a "build to order process" according to a customer's specification.

8 Claims, 10 Drawing Sheets

TERMINAL DESIGN WITH SHOCK ISOLATION ASSEMBLY

FIELD OF THE INVENTION

The invention described below generally relates to systems and methods of shock isolation for a portable electronic unit, and in particular to an isolation assembly employing several stages of energy absorption for dampening an external mechanical shock.

DESCRIPTION OF THE RELATED ART

Typically there is a desire to increase the ruggedness for electronic units, while lowering associated assembly costs and improving overall function. In particular, many electronic units such as hand held mobile terminals, communication units, and the like are generally susceptible to damage during employment in harsh environments. Such units are generally assembled by enclosing internal electrical components, such as a central processing unit (CPU) board, display, keyboard, and internal wiring, within a housing made of plastic or another structural material. The enclosure normally serves as a protective measure and is typically formed in two parts having an upper housing and a lower housing. The electronic components can be mounted to one or both sides of the housing.

For such units there are applications wherein associated printed circuit board and electronic components can be exposed to high shock conditions and accelerations, e.g. of the order of 1000 to 4000 g's of acceleration during deployment. In particular, with an increasing number of electronic circuitry in the form of printed circuit boards, the need has commensurately increased to ensure that associated electronic components as well as the electrical interconnections and the substrate on which the electrical interconnections are printed, are each adequately protected from vibration and shock damage that can result from high levels of acceleration.

Typically, printed circuit boards are mechanically secured to a chassis or frame of an electronic unit without provision for resilient mounting. Consequently, whenever such unit is subject to shock or vibration from an external source, the printed circuit board may be damaged if the external shock is directly transmitted to it.

Such shock to a circuit board or an electronic component can occur when the unit experiences a sudden deceleration, e.g. when an a hand held scanner device is dropped on a hard concrete surface, then its electronic component can experiences a deceleration of as much as 3000 g's. Such deceleration typically causes the weight of the unit to increase by the same factor as the acceleration in a short period of time. For circuit boards, a deceleration of this magnitude will destroy the bonding between the related semiconductor chips and its board. Another problem associated with such levels of acceleration or deceleration is that the printed circuit board may experience a significant deflection, since it is generally supported on its edges as a simple supported beam. Such deflection, if severe, can in turn exert bending and torsional forces on various components mounted on the printed circuit board and damage the electronic unit.

To mitigate such damages, generally electronic designers have resorted to employing thicker printed circuit board to increase its resistance to bending. This approach has the disadvantage of increasing the weight of the equipment, and the full effect of the increase in an "area moment of inertia" feature is not realized. Moreover, since printed circuit boards typically are plated-through holes, the maximum thickness of the boards is limited by the practicality of obtaining such holes. Another approach for reducing deflections under shock loading is to decrease the span between the supporting edges of the printed circuit board and to provide center supports. Such alternatives have the effect of decreasing the component count on the individual boards, rendering the required design volumes larger than that which is available in some applications.

Generally, shock mounting assemblies avoid sudden variations in acceleration, e.g. by applying the acceleration over a longer period of time such as by mounting the object on springs or other elastomers. However, conventional methods of shock isolations have been focused only on shock mounting isolations for units only at one level, e.g. external mounting, or for a particular component of the unit, e.g. a display or a circuit board, and not to a total and integrated approach. Moreover, mounting a printed circuit board by employing a simple spring-biased suspension between it and the chassis of the article will not entirely solve the problem of protecting the printed circuit board from potential damage from shock and vibration. A major reason for this involves unstable mechanical support coupled with undesirable persistence of suspension vibration. Shock or vibration delivered by an external source to the chassis of the article will be transmitted to the spring-biased suspension resulting in suspension vibration of a particular frequency and amplitude that in time will strain the substrate of the printed circuit board, leading to its eventual failure. Another reason that a simple spring-biased mounting for a printed circuit board is not desirable is that suspension vibration will in time cause failure of the electrical leads connecting to the printed circuit board from elsewhere in the electronic unit.

Therefore, there is a need to overcome the aforementioned deficiencies associated with conventional devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The present invention provides systems and methodologies for isolating a portable hand held electronic unit from external mechanical shocks and/or vibrations by dampening them at several levels n, n being a positive integer. In one aspect according to the present invention, a mechanical shock exerted on the electronic unit is absorbed, in turn, at three different fronts, by namely; the external bumper system, the elastic housing design features, and the internal frame isolation. Thus, a shock is significantly reduced by the time it reaches the circuit board and related solder joints will experience less mechanical stress because there is less or no circuit board bending. Accordingly, there is a higher likelihood that the circuit components will not be damaged or become detached from the circuit board.

In one aspect according to the present invention, the electronic unit is a hand held mobile computer with the external bumpers being positioned as raised protuberances around an outer surface of a housing that encapsulates internal electrical components of the mobile computer. As such, in an event the mobile computer is dropped, the raised bumper configuration contacts the ground surface and functions as a first layer of shock isolation.

Such configuration permits for a suitable selection of bumper assembly based on severity of the environment and can be tailored to a client's preferences. The assembly can further include rubber portions over molded on top of the external bumpers and/or external housing.

The housing design features provide the second front against an external mechanical shock being exerted on the mobile computer. In one aspect of the present invention the housing comprises an upper top housing and a lower bottom housing. The top housing includes a circuit board(s) encapsulating portion, designed to pivot relative to rest of the top housing as to dampen an external shock and prevent damage to electronic components. The bottom housing can further include a handle portion deigned to hinge relative to other parts of the bottom housing in an event of a drop. Such a design enables a displacement of various portions relative to other segments of the housing, and a gradual dampening of an external mechanical shock. Moreover, such pivoting can be designed to occur only if the external mechanical shock exceeds an unacceptable limit, which induces strains and/or stresses that can not be safely handled by the components of the unit. Such pivoting can also occur if external mechanical shock exceeds a predetermined level, e.g. able to overcome a stiffness at the pivoting juncture. The materials employed for fabricating the housing itself can also play an important role in dampening an external force. These materials may be of thermoset, thermoplastic, or metallic origin.

The third front for dampening an external force or vibration relates to an arrangement of the electronics within the housing. According to one aspect of the present invention, circuit board(s) with electronic components mounted thereupon are partially or totally encased by a rigid body fabricated from a material with a high strength to weight ratio, i.e. very stiff material, such as magnesium or glass filled plastic. Such stiff encapsulation facilitates maintaining a planar configuration of the circuit boards that are mounted on and/or enclosed there within, during the external shock/drop loads. Accordingly, a deflection of a circuit board in an event of a fall of the unit is reduced or eliminated, since a circuit board maintains its planar configuration.

In one aspect of the present invention, the internal frame can further incorporate an EMI shield for reducing electromagnetic interference. Moreover, the stiff internal frame system can be surrounded by a shock mount bumper system, for example a rubber frame running around a perimeter of the stiff internal frame system, as to further reduce a shock force to circuit board(s) and electronic components in an event of a drop. Such rigid frame enclosure of stacked circuit boards, according to another aspect of the present invention, simplifies production of the mobile computer by enabling a "build to order process" and a modularity at the manufacturing level. Accordingly, different electronic configurations for the unit can be accommodated without a need to wholly redesign the mobile product to suit a customer's unique preference.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings. To facilitate the reading of the drawings, some of the drawings may not have been drawn to scale from one figure to another or within a given figure.

DETAILED DESCRIPTION OF THE INVENTION

The various aspects of the present invention will now be described with reference to drawings. The invention provides for a system and methodology of isolating a portable electronic unit from external mechanical shocks and/or vibrations, so that the shock energy is significantly absorbed, and reduced to an acceptable safe limit by the time it reaches the electronic components.

Figure 1:
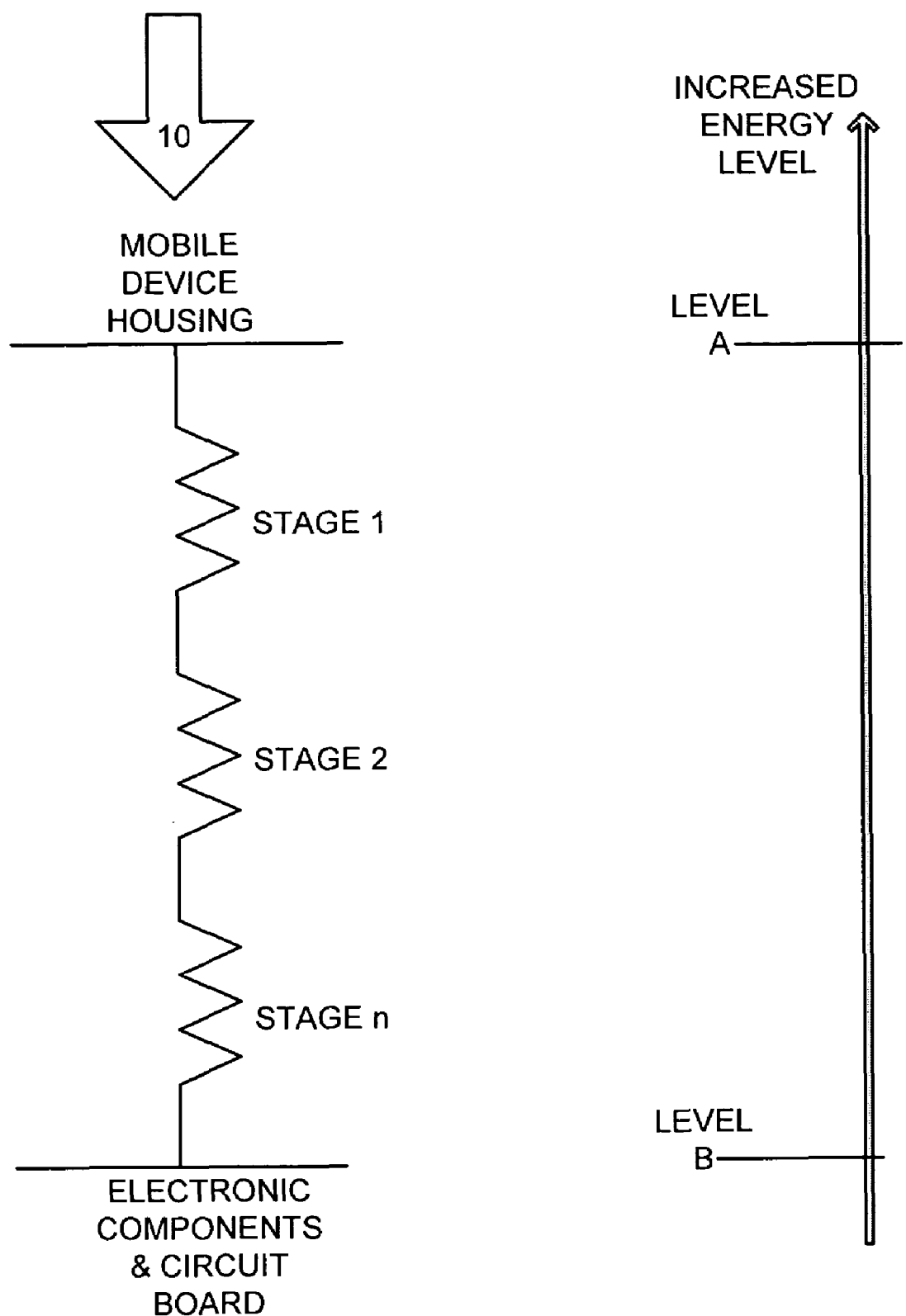
FIG. 1 illustrates a schematic model for a shock reduction assembly according to one aspect of the present invention.

Referring initially to FIG. 1, an exemplary model that depicts one aspect of the subject invention is illustrated. A mobile unit is subjected to an external force as depicted by arrow 10. The mobile unit can be any hand held device with its internal electronic component, such as a circuit board with a Central Processing Unit (CPU) enclosed within a housing. The external force 10 can be induced via a mechanical shock, for example by dropping the unit on a hard surface.

Level A on the vertical energy axis depicts a level of energy created by external force 10 that can not be tolerated by the electronic components of the portable unit. Such a level of energy can either damage the individual electronic components of a circuit board or create unacceptable levels of stress or deflection in a circuit board as to detach associated individual electronic components. Typically, printed circuit board deflections can overstress and fatigue solder joints, resulting in failures.

The accepted damped level of energy that can be safely handled by the circuit board is depicted by level B. As modeled, in one aspect according the present invention, energy resulting from mechanical force 10 exerted on the electronic unit is absorbed, in turn, at three different stages or fronts 1, 2, and 3. Each front is illustrated as a spring to indicate its dampening effect.

Stage 1 represents the external bumper system that includes various deformable material placed on an outer surface of the unit's housing. Such material can include various cushion members in the form of resilient or rubber-like pads. Such members are connected to the housing, and if the housing comprises two parts, e.g. an upper housing and a lower housing, such member can act as an additional engaging member by pressing the top part to the bottom part.

Stage 2 of the shock reduction system employs design features of the housing to partially absorb the energy shock, by displacing various segments of the housing relative to other portions. In one aspect according to the present invention, a handle of the housing can move relative to the rest of the housing, reducing a fall impact when the handle hits the ground. In another aspect, the top housing can include two parts that can shift relative to one another and dampen an energy level. At such stage 2 of shock isolation, the materials employed for fabricating the housing itself can also play an important role in dampening an external force.

Stage 3 of the shock reduction system, according to one aspect of the present invention, employs an internal stiff body for the circuit board and its electronic components. Such stiff encasing can be fabricated from materials having a high strike to weight ratio, such as magnesium. The stiff envelope can then be placed upon and/or within a shock mount bumper system, for example a rubber frame running around a perimeter of the stiff body enclosure, as to further reduce a shock force to circuit board(s) and electronic components. After the energy shock passes through this third stage of system isolations, it reaches energy level B that is safe and acceptable for the circuit board and the electronic components.

Figure 2:
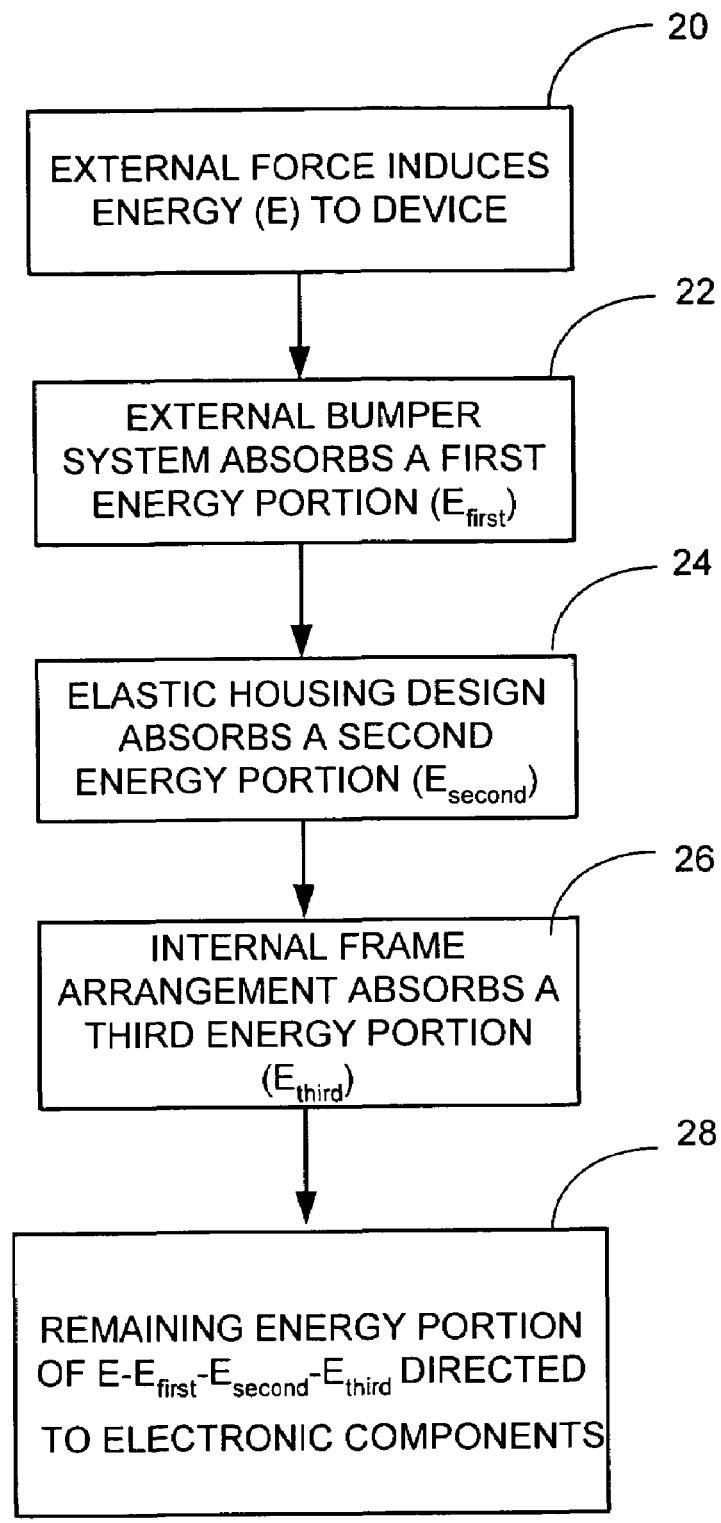
FIG. 2 illustrates an exemplary flow chart for absorbing an external energy shock according to one aspect of the present invention.

FIG. 2 illustrates an exemplary flow chart according to one aspect of the present invention. At 20 an external force is applied to the portable unit. Such force, if directly transferred to the electronic components with little or no absorption, can create unacceptable levels of stress and/or strains within a circuit board of the portable unit. In accordance with an aspect of the present invention, at 22 a first portion of the energy created by such force is absorbed via a deflection and/or dampening effect of an external bumper system attached to the housing. Subsequently, the remaining amount of energy $(E-E_{first})$ is directed to a second isolation system, where a second portion of the energy gets absorbed at 24, thus leaving an amount of $(E-E_{first}-E_{second})$. Such remaining energy level is being directed to a third level of shock isolation where after absorbing a third portion of energy at 26, the initial amount of energy is reduced at 28 below or equal to an allowable limit for the circuit board and/or electronic components, i.e., $E_{allowable}$ larger or equal to $E-E_{first}-E_{second}-E_{third}$.

Figure 3A:
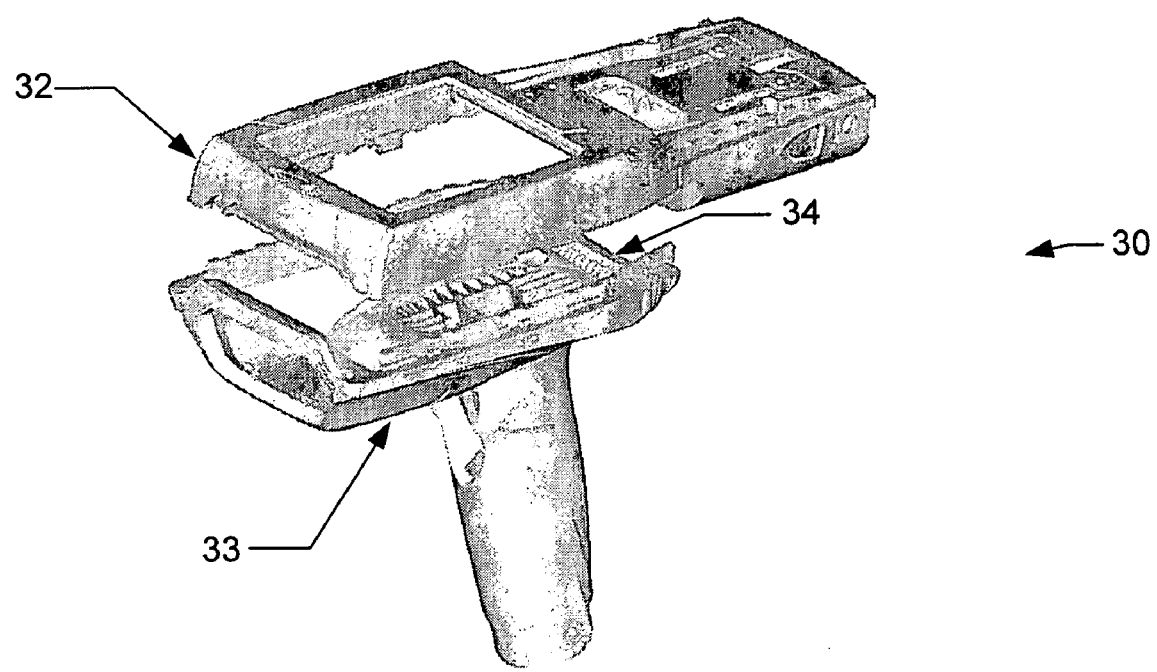
FIGS. 3a & 3b illustrate a perspective view of a housing compartment including two housing parts, and a terminal unit according to one aspect of the present invention.
Figure 3B:
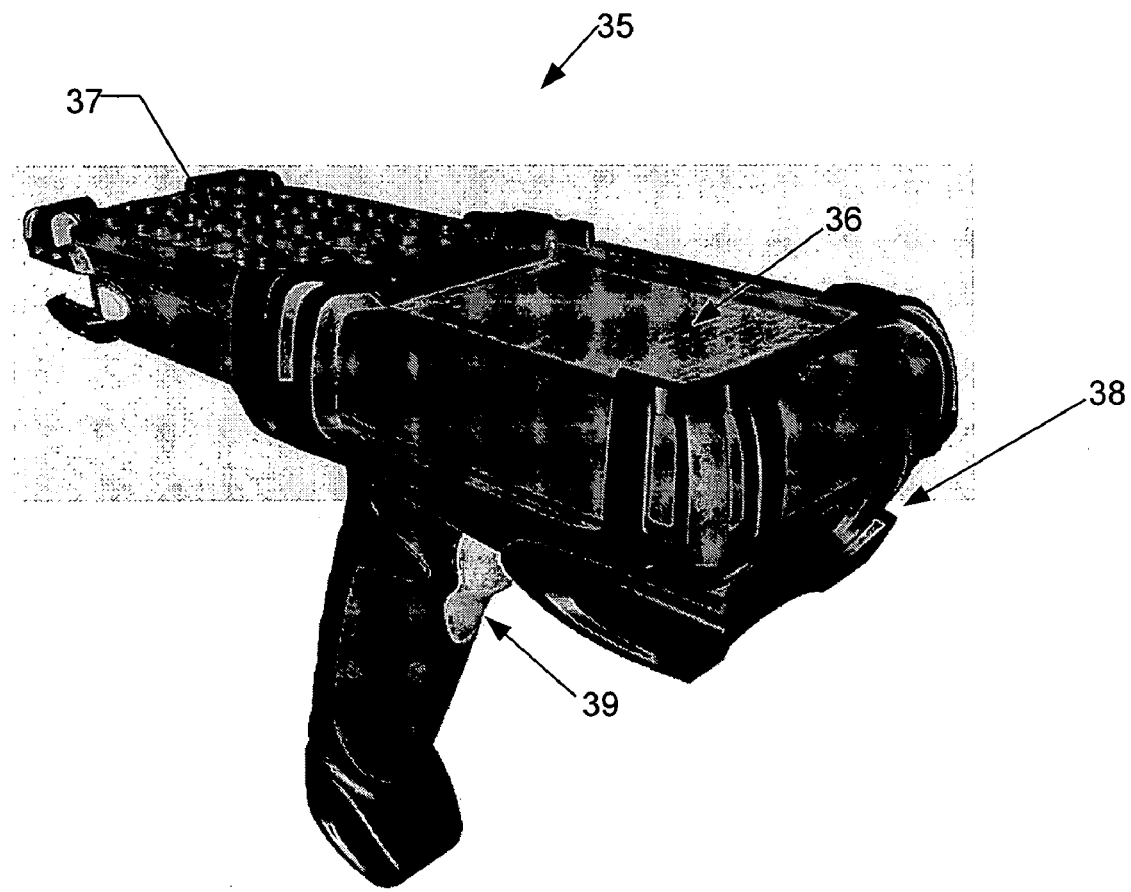

FIGS. 3a and 3b illustrate a perspective view of a housing compartment including two housing parts and a portable unit employing such housing according to one aspect of the present invention. Referring initially to FIG. 3a, a terminal housing assembly according to one aspect of the present invention is illustrated. The illustrated housing assembly 30 can be applied for containment of an electronic device, such as devices employed in numerous types of commercial and industrial applications (e.g., a bar code reader unit, code scanner unit, laser and/or light emitter unit, data storage instrument, computers, personal digital assistants, communication units and the like), which are typically assembled by enclosing internal electrical components, e.g. a Central Processing Unit (CPU) board, display, and internal wiring, within the housing assembly. The housing 30 is configured to be held in the palm of one hand with the keys on a subsequently mounted keypad engageable by the thumb or fingers of the hand holding the housing, or by the other hand. The hand held portable terminal is formed via a top housing 32 assembled to a bottom housing 33. The top housing 32 can include various microphone ports, audio jack sockets, various interface feature for information transfer, such as serial communication ports for different communication standard and/or protocol, e.g., parallel, SCSI, Firewire (IEEE 1394), Ethernet. etc.

The bottom housing 33 can have connecting structures 34 in the form of various latching mechanism employed to assemble the lower housing 34 with the upper housing 32. A plurality of such interlocking joints 34 can be spread around the perimeter of the connecting area of the lower housing 33 and/or the upper housing 32. Typically, such interlocking mechanism is designed to minimize its occupied volume, while at the same time providing a secure attachment to prevent disengagement from the upper housing.

Typically, materials employed for fabricating the housing 30 can include various types of thermoset and thermoformed plastic, or the like. The housing 30 may also include a hand strap (not shown) for user comfort. The hand strap can mount the housing 30 on the back of the operator's hand by passing over a user's knuckle, so that the scanner apparatus can be operated with ease. The hand strap can be connected to the body of the terminal 30 at various points for example the lower handle or the sides.

Moreover, various gaskets (not shown) can be provided along a perimeter of the top housing 32 for any opening (e.g. a display, interconnect point, and the like) to mitigate contamination, which might otherwise enter the electronic device assembly from outside and thus affect performance of the unit. The gaskets can be of rubber, foam, or any other elastomer, operable to sufficiently seal the assembly of the mobile terminal.

Referring now to FIG. 3b, an exemplary hand held scanner is illustrated that employs a housing as described. The scanner 35 includes a display 36 for displaying information. The display 36 can be a touch screen and may employ capacitive, resistive touch, infrared, surface acoustic wave, or grounded acoustic wave technology. Furthermore, the display 36 can be a liquid crystal device, cathode ray tube (CRT), field emission device (FED, also called flat panel CRT) or any other display device suitable for creating graphic images and alphanumeric characters recognizable to the user. Terminal 35 further includes a user interface keypad 37 to enter information concerning modes of operation of the mobile terminal or to carry out cancellation or manipulation operations on information provided by the terminal. The keypad 37 consists of electrometric keys that are positioned within a central portion of a top surface for the upper housing.

As shown, the portable bar code scanner 35 is configured to be held with the palm of a user's hand, and various keys on its keypad 37 can be engaged by thumb or fingers of the hand holding the housing. The user aims the window 38 at a desired indicia to be read and presses the trigger 39 that activates the reader unit. Display unit 38 can be employed to display information relating to a mode of operation of the electronic unit, or display check information relating to an item being read by an optical scanner (not shown) located in the electronic unit. The bar code scanner 35 can be employed in a wireless communication network for tracking inventory, storing data, etc. No cables are required to connect the scanner apparatus to a computer device, thereby further reducing its weight and consequent fatigue, and eliminating the inefficiencies caused by entanglement with such cables. Moreover, its size allows easy access to difficult scanning locations. The scanner 35 provides rapid key entry and reading of displayed information, providing the operator with real time data so that decisions and actions can be quickly implemented. A user may input and/or process data via keypad, scanner element, etc. independent of the hand-held terminal 35 being connected to a communication network, for example a LAN or a WAN. When hand-held terminal 35 does not include a transceiver to provide for real time communications, the data can be stored in memory within the hand-held terminal 35. Accordingly, should the hand-held terminal 35 subsequently be connected to a network, stored data can be downloaded to a host computer (not shown).

Figure 4:
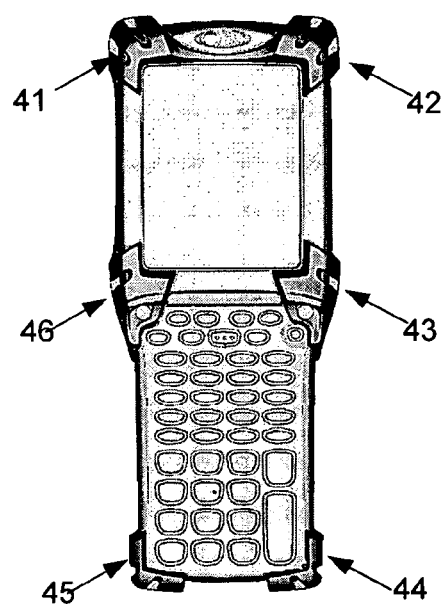
FIGS. 4 & 5 illustrate a perspective and a top view for an external bumper system according to one aspect of the present invention for a mobile computer with a handle.
Figure 5:
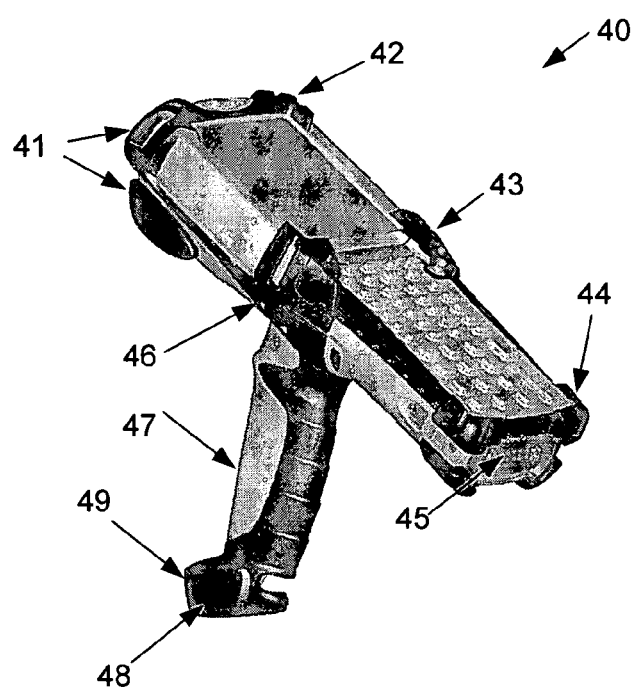

FIGS. 4 & 5 illustrate a top and perspective view for an external bumper system according to one aspect of the present invention. External bumpers 41 thru 46 are positioned on an outer side of a top housing 40. Such external bumpers include elastomeric materials, being bonded or over molded as raised protuberances around an outer surface of housing 40 that encapsulates internal electrical components of the scanner. In an event the scanner is dropped, such raised configuration initially comes in direct contact with ground surface and functions as the first stage of shock isolation.

Such external bumper assembly permits for a suitable selection of bumper configurations based on severity of the environment. For example, mobile computers may be employed in a wide range of temperatures, e.g. −20° C. to +40° C. or be expected to tolerate falls from specific heights. Such range of working conditions, for example, can influence the stress and/or strain levels induced in the portable scanner. Accordingly, the external bumper system can be adjusted based on a severity of its environment, and be tailored according to a customer's preference. Moreover, should the housing include two parts, e.g. an upper housing and a lower housing, such elastomeric bumpers can act as an additional engaging element by pressing the top part to the bottom part. The assembly can further include rubber portions over molded on top of the external bumpers and/or outer surface of the housing. For example, according to one aspect of the invention, handle 47 is being over molded by rubber material to create a shock absorber 49 that acts as a soft cushion in an event of a drop. The shock absorber 49 can comprise various grooves 48 around the perimeter as to allow the shock absorber to further collapse on itself and diffuse the shock energy in case of a drop.

Figure 6:
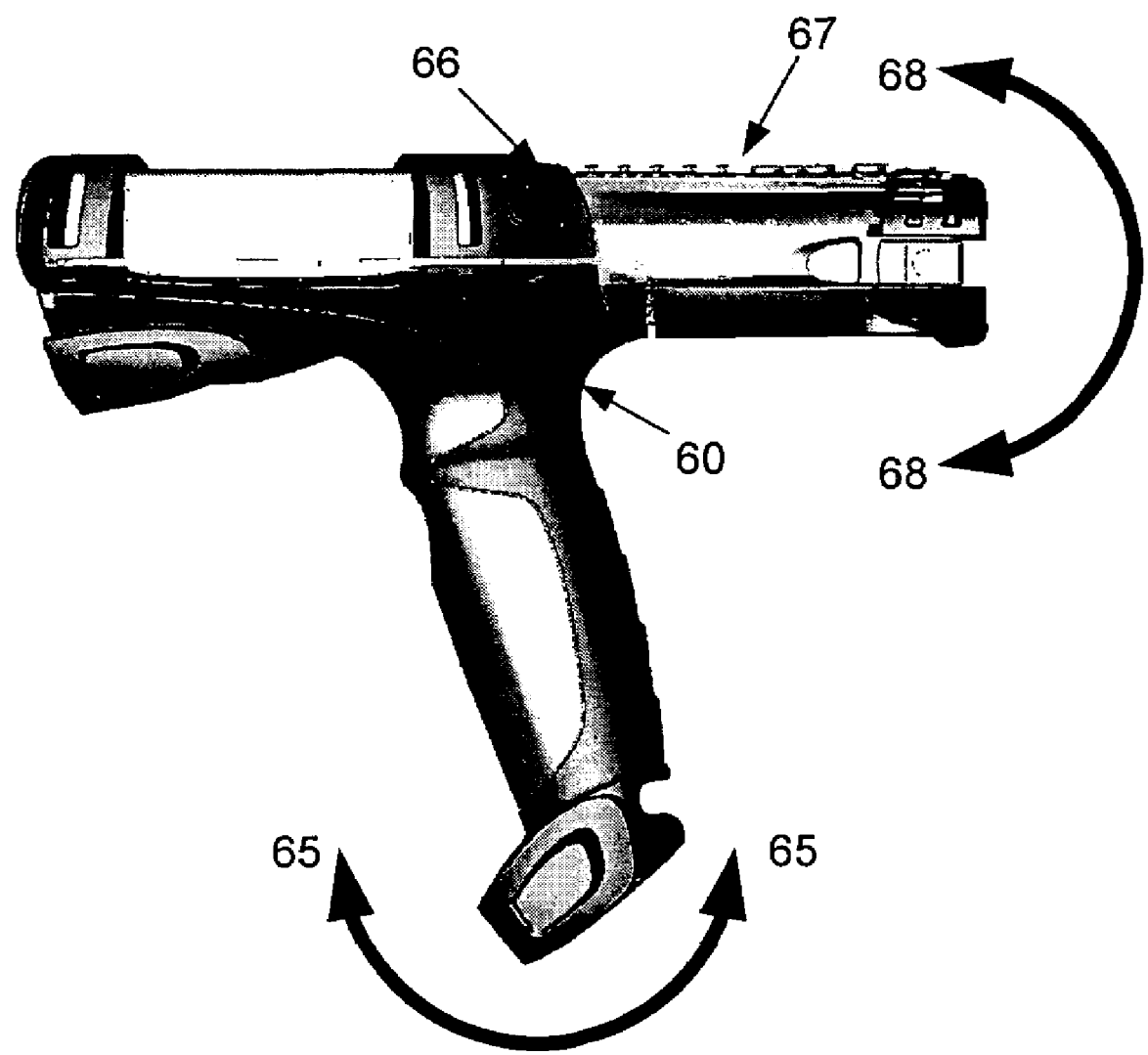
FIG. 6 illustrates a side view showing locations for sections designed as a hinge according to one aspect of the present invention.

FIG. 6 illustrates a side view showing locations for sections designed to function as a pivot according to one aspect of the present invention. Such pivoting creates relative movement of one section of the housing with respect to another segment. Such housing design features, as well as the material employed for fabrication of the housing, provide for the second stage of dampening an external mechanical shock. According to one exemplary aspect of the present invention, when high stress and strains are exerted upon the unit, several sections on the unit function as a pivot as to allow a dislocation of one portion of the housing with respect to another. For example, in one exemplary aspect according to the present invention, section 60, i.e., junction of the handle and base of lower housing, functions as a hinge allowing for a rotation of the handle in the direction of the arrows 65 with respect to the rest of the housing, thus reducing a fall impact when the handle hits the ground.

Similarly, section 66 functions as a hinge by allowing a relative movement of a right segment 67 in the direction of the arrows 68. Such relative shift provides for an additional dampening of a shock energy. Moreover, such pivoting can be designed to occur only if the external mechanical shock exceeds an unacceptable limit, which induces strains and/or stresses that can not be safely handled by the components of the unit. Such pivoting can also occur if external mechanical shock exceeds a predetermined level, e.g. the external bending moment overcomes a moment resistance at the pivoting juncture. Thus, absent high stresses and during routine applications of the unit, no rotation occurs around sections 60 and 66.

Figure 7:
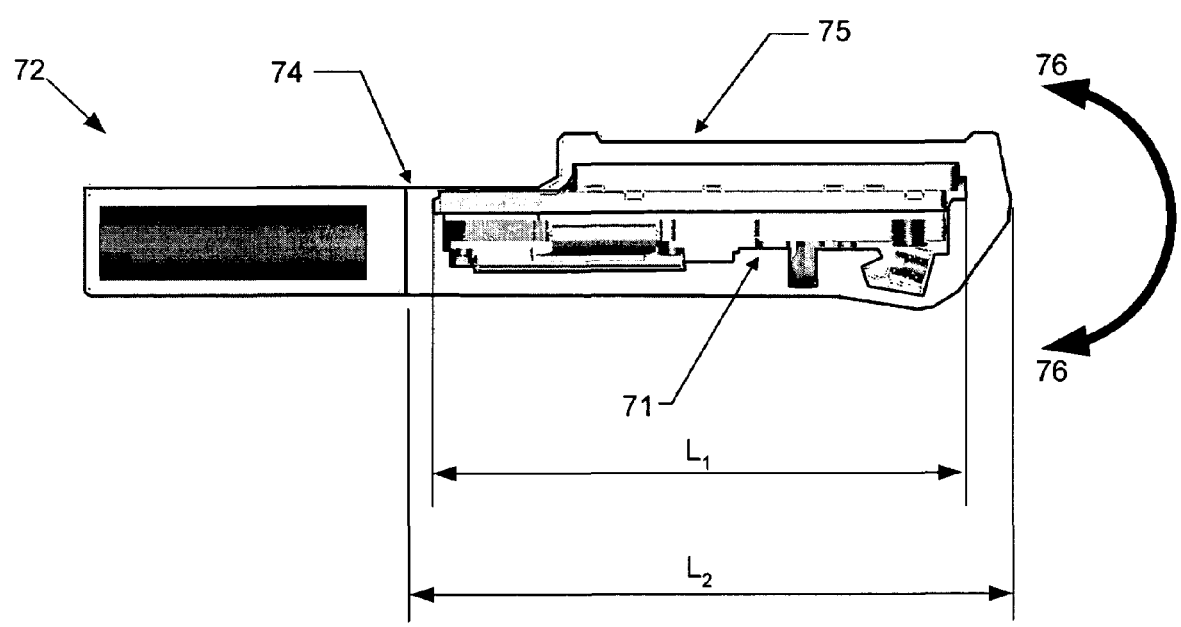
FIG. 7 illustrates a side view cross section showing the circuit boards and the stiff enclosure relative to the housing.

Referring now to FIG. 7, a side view is illustrated of various stacked circuit boards being at least partially enclosed by a rigid body 71 according to one aspect of the present invention. The rigid body 71 enables the circuit boards to generally maintain their planar configuration while under stress. The stacked circuit boards are mounted on a common rigid frame within the housing 72. The housing 72 is flexibly designed as to permit a rotation of segment 75 around a section 74 in a direction of arrows 76, should an external bending flexure exceed the bending stiffness of section 74. Such bending flexibility provides for a partial absorption of a shock energy exerted on the unit.

Moreover, since the length of the circuit board(s) $L_1$ is shorter than a length of the segment 75 ($L_2$) of the top housing, i.e., the circuit boards do not occupy a full length of segment 75, a flexural bending of such segment 75 is less likely to be transferred to the circuit boards. Accordingly, electronic circuit boards encased in body 71 can further maintain their flat configuration while the unit experiences an external mechanical shock and/or vibration.

Figure 8:
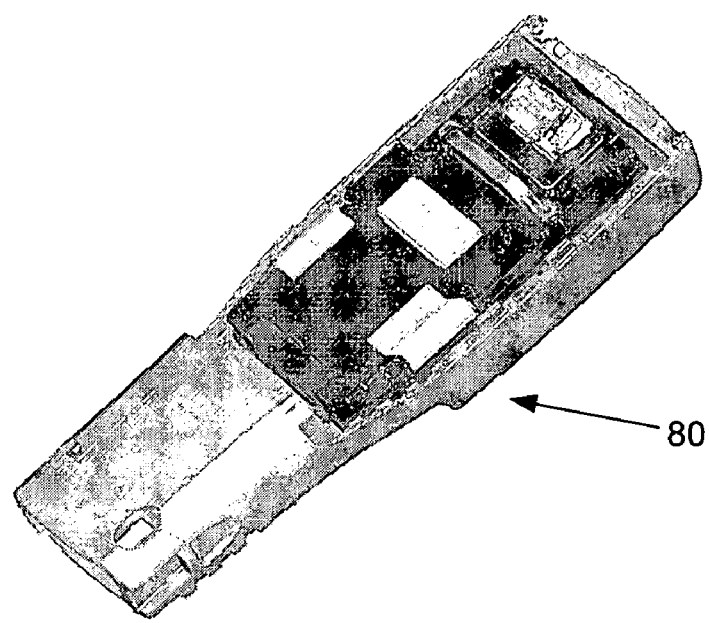
FIGS. 8 & 9 illustrate exploded perspectives for an electronic unit that employs an internal bumper and frame system according to an aspect of the present invention.
Figure 9:
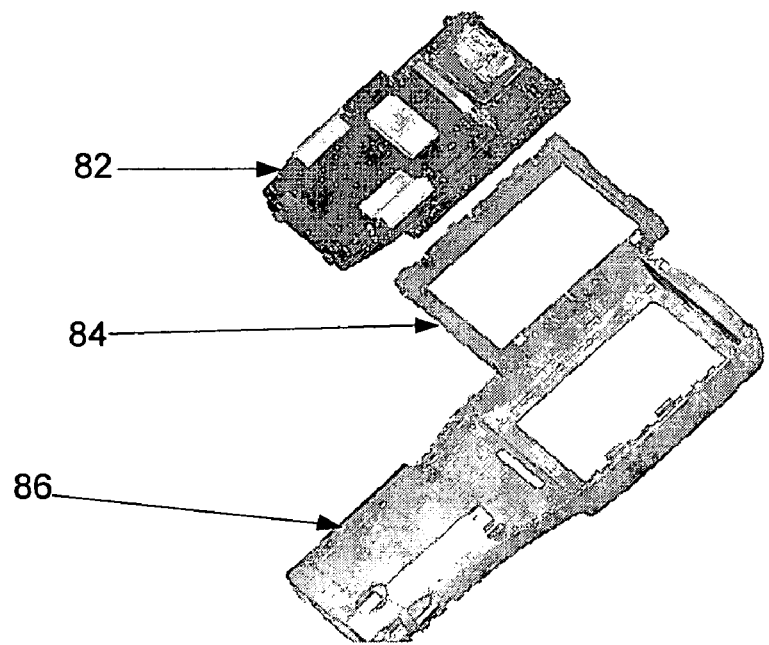

FIGS. 8 & 9 illustrate a broken perspective and an exploded view of the third level of shock absorption employed for a hand held unit 80 in accordance with an aspect of the present invention. As explained earlier, a rigid frame body 82, partially or totally encapsulates one or more circuit boards that are stacked together. The stiff body 82 is fabricated from material having a high strike to weight ratio such as magnesium. Such rigid frame body 82 can further incorporate an electromagnetic interference shield as to partially or totally cover electronic components mounted on the circuit boards. The rigidity of frame 82 assists the circuit boards to maintain a generally planar configuration when the unit is subjected to an external force. Thus, solder joints will experience less mechanical stress because there is little or no circuit board bending. Accordingly, there is a higher likelihood that the circuit components will not be damaged or become detached from the circuit board.

According to one aspect of the present invention, the rigid frame 82 is positioned on an internal bumper system 84. The bumper system 84 can be, for example, a rubber frame running around a perimeter of the stiff frame enclosure 82. Such bumper system 84 functions as a resilient cushion member interposed between the rigid frame 82 and the body of the housing, thus isolating the rigid frame 82 from the effect of a physical shock to the housing 86, as would occur if the unit was dropped. Put differently, in case of an external shock to the portable unit, bumper system 84 enables the rigid frame 82 to shift laterally and float within the housing. After the energy shock has been passed through such third stage of system isolations, it reaches a level that is acceptable for the circuit board and its electronic components. Thus, a deflection of the circuit board is reduced or eliminated and the circuit board maintains its planar configuration.

According to another aspect of the present invention, such rigid frame enclosure and isolation assembly simplifies production of the portable bar code scanner, by enabling a "build to order process" and a modularity at manufacturing level. Since the rigid frame merely drops in the housing without a need for a connection mechanism, e.g. a screw, it can be readily replaced. In one aspect of the present invention, two separate circuit boards, a main board and an option board are stacked together upon a common sub frame of a bar code scanner. The main board includes common or generic electronic components that are employed across various configurations of the bar code scanner and is typically not selected by a customer. In contrast, the option board includes unique electronic components that are selected by the customer according to specific needs, for example components associated with choice of data capture unit, scan engine, transceiver, display and the like. Such optional circuit board can be readily replaced according to a customer's preference. Thus, the third stage of shock isolation according to the subject invention simplifies production and enables a "build to order process" for scanner fabrication.

Figure 10:
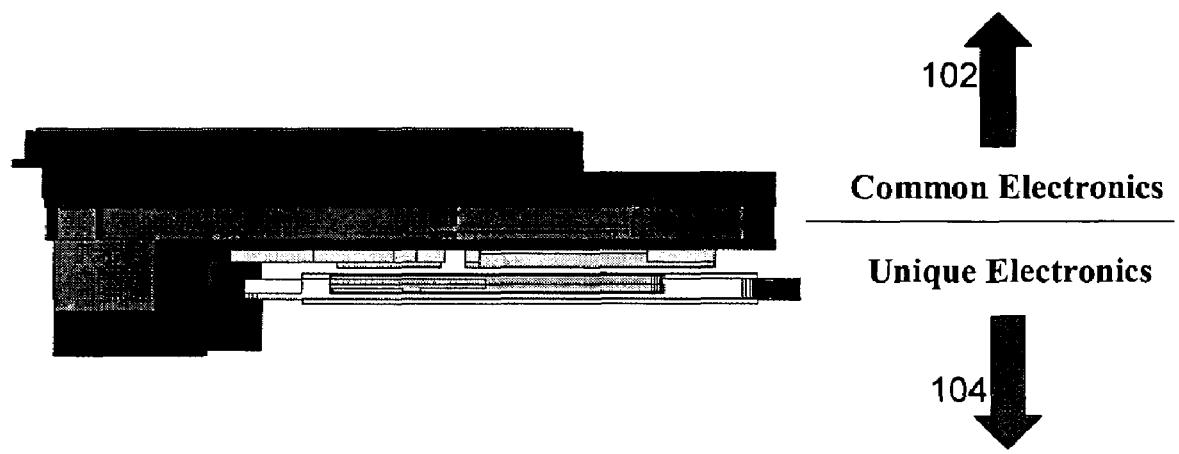
FIG. 10 illustrates an assembly of stacked circuit boards enabling a design modularity at a manufacturing level according to one aspect of the present invention.

FIG. 10 illustrates a similar assembly for a multi stacked arrangement of circuit boards, which are subsequently encapsulated by the magnesium rigid frame according to one aspect of the present invention. The rigid frame system is designed such that it maintains common or shared mounting points between the common generic portion of the electronic stack and the unique portion. Such stacked circuit boards include an upper layer of circuit boards 102 that are common for various models of the portable unit, and a lower portion of circuit boards 104 that are unique electronics manufactured for particular devices or applications. The lower stack 104 can be readily replaced at the manufacturing level according to the customer's specification, without a need to redesign the mobile product. Such an arrangement facilitates fabrication and significantly lowers costs associated with terminal design and fabrication.

Figure 11:
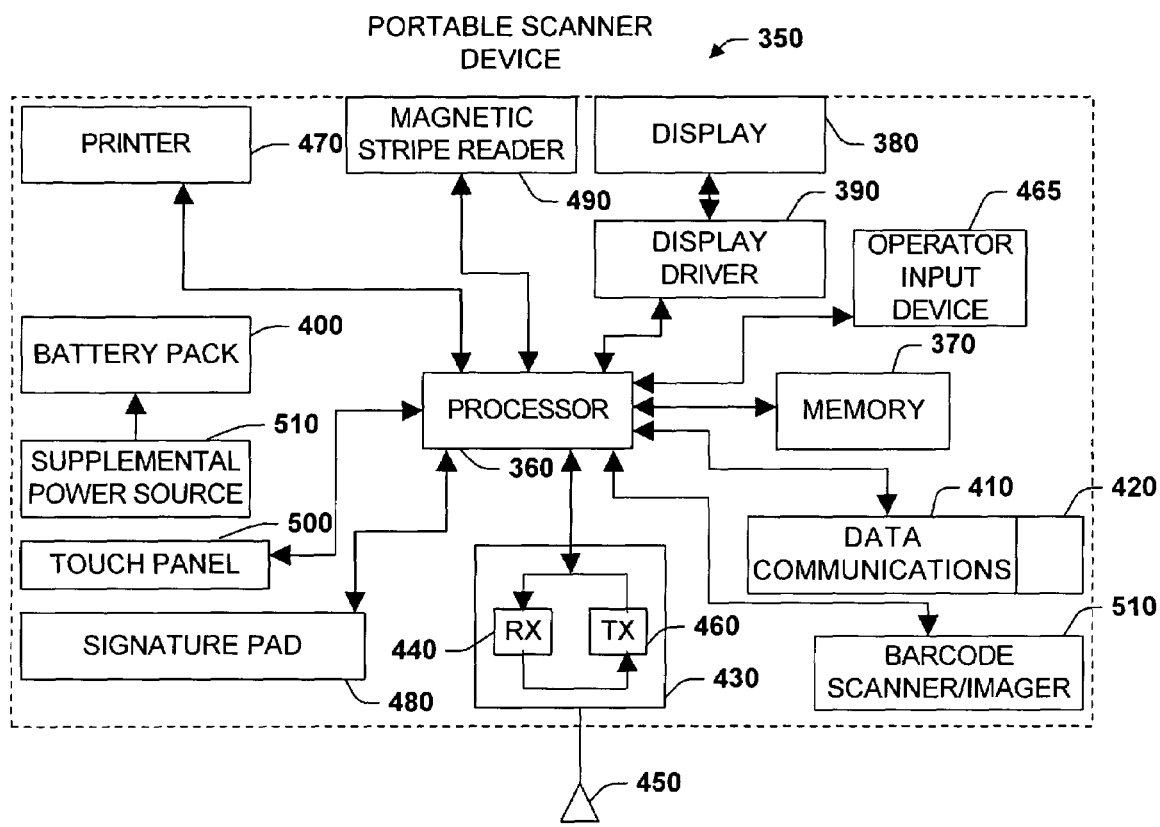
FIG. 11 illustrates a schematic representation for a particular hand held mobile computer employing an isolation system according to the present invention.

Turning now to FIG. 11, a schematic block diagram according to one aspect of the present invention is shown in which a processor 360 is responsible for controlling the general operation of a portable scanner device 350 that employs a shock isolation system as discussed earlier. The processor 360 is programmed to control and operate the various components within the scanner device 350 in order to carry out the various functions described herein. The processor or CPU 360 can be any of a plurality of processors, such as the p24T, Pentium 50/75, Pentium 60/90, and Pentium 66/100, Pentium PRO and Pentium 2, and other similar and compatible processors or micro controllers. A processor such as Intel's 8 bit microcontrollers, the 8031, 8051 or 8052 can also be employed. The manner the processor 360 can be programmed to carry out the functions relating to the present invention will be readily apparent to those having ordinary skill in the art based on the description provided herein. A memory 370 tied to the processor 360 is also included in the portable scanner device 350 and serves to store program code executed by the processor 360 for carrying out operating functions of the scanner. The memory 370 also serves as a storage medium for temporarily storing information such as receipt transaction information and the like. The memory 370 is adapted to store a complete set of the information to be displayed. According to one particular aspect, the memory 370 has sufficient capacity to store multiple sets of information, and the processor 360 could include a program for alternating or cycling between various sets of display information.

Display(s) 380, which as described earlier can be mounted on a side of the terminal housing and/or key pad, is coupled to the processor 360 via a display driver system 390. The display 380 is operable to display data or other information relating to ordinary operation of the portable scanner 350. For example, the display 380 may display a set of customer information, which is displayed to the operator and may be transmitted over a system backbone (not shown). Additionally, the display 380 may display a variety of functions that control the execution of the portable electronic device 350. The display 380 is capable of displaying both alphanumeric and graphical characters. Furthermore, as explained earlier the display 380 may be a touch screen that is capable of receiving user information as well as displaying information.

Power is provided to the processor 360 and other components forming the portable electronic device 350 by a battery pack 400, which is located in the top housing. In the event that the battery pack 400 fails or becomes disconnected from the portable electronic device 350, a supplemental power source 510 provides power to the processor 360, the supplemental power source 510 being a super capacitor connected electrically in parallel with the battery 400. The hand-held terminal 350 may enter a minimum current draw of sleep mode upon detection of a battery failure.

The portable electronic device 350 includes a communication subsystem 410 that includes a data communication port 420, which is employed to interface the processor 360 with the main computer. The portable electronic device 350 also optionally includes an RF section 430 connected to the processor 360. The RF section 430 includes an RF receiver 440, which receives RF transmissions from the main computer for example via an antenna 450 and demodulates the signal to obtain digital information modulated therein. The RF section 430 also includes an RF transmitter 460 for transmitting information to the main computer, for example, in response to an operator input 465, e.g. via a keypad, or the completion of a transaction. Peripheral devices, such as a printer 470, signature pad 480, magnetic stripe reader 490, touch panel 500, can also be coupled to the portable scanner device 350 through the processor 360.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising".

What is claimed is:

1. A portable data terminal comprising:
   a bar code reader;
   a flexible housing comprising a component rotatable about a junction of the housing and an outer surface with energy absorbing material connected thereto for an initial absorption of a physical shock energy exerted thereupon;
   a stiff enclosure for at least partially encapsulating a circuit board; and
   a resilient member interposed between the housing and the stiff enclosure, the resilient frame and the stiff enclosure act together to further dampen the physical shock energy.

2. The terminal of claim 1, the flexible housing including a top portion and a lower portion with the rotatable component as part of the top portion.

3. The terminal of claim 2, the handle comprising rubber insert molding.

4. The terminal of claim 2, the circuit board has a length shorter than a length of the rotatable component.

5. The terminal of claim 1, the junction being at a point of connection between a handle of the data terminal and a base of the lower portion.

6. The terminal of claim 1, the energy absorbing material comprising a raised bumper assembly.

7. A method for mitigating physical shock energy exerted on a hand held terminal comprising:
   rotating a portion of the hand held terminal housing about a junction of the housing, the junction being at a point of connection between a handle of the terminal and a base of a lower portion of the housing;
   employing a bumper assembly placed on an outer surface of the hand held terminal housing to absorb an initial portion of the shock energy; and
   employing an internal bumper system interposed between the housing and at least one circuit board within the housing, to further absorb the shock energy.

8. The method of claim 7 further comprising providing portions of the housing that are displaceable with respect to each other such that displacement of the portions further dampens the shock energy.

* * * * *